United States Patent
Law et al.

(10) Patent No.: US 9,652,466 B2
(45) Date of Patent: May 16, 2017

(54) ALTERNATE DATA STREAM CACHE FOR FILE CLASSIFICATION

(71) Applicant: MICROSOFT TECHNOLOGY LICENSING, LLC, Redmond, WA (US)

(72) Inventors: Clyde Law, Seattle, WA (US); Paul Adrian Oltean, Redmond, WA (US); Ran Kalach, Bellvue, WA (US); Nir Ben-Zvi, Redmond, WA (US); Matthias H. Wollnik, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 14/456,732

(22) Filed: Aug. 11, 2014

(65) Prior Publication Data

US 2014/0351225 A1    Nov. 27, 2014

Related U.S. Application Data

(62) Division of application No. 12/605,451, filed on Oct. 26, 2009, now Pat. No. 8,805,837.

(51) Int. Cl.
  *G06F 17/30* (2006.01)
(52) U.S. Cl.
  CPC .. *G06F 17/30115* (2013.01); *G06F 17/30598* (2013.01)
(58) Field of Classification Search
  CPC ............................................... G06F 17/30598
  See application file for complete search history.

(56) References Cited

U.S. PATENT DOCUMENTS

| 5,917,723 A | 6/1999 | Binford |
| 6,466,944 B1 | 10/2002 | Stokes |
| 8,805,837 B2 | 8/2014 | Law et al. |
| 2005/0226059 A1 | 10/2005 | Kavuri et al. |

(Continued)

OTHER PUBLICATIONS

Garry Trinder "Classification—under the hood (part 1)", May 14, 2009.*

(Continued)

*Primary Examiner* — Apu Mofiz
*Assistant Examiner* — Cindy Nguyen
(74) *Attorney, Agent, or Firm* — Merchant & Gould

(57) ABSTRACT

Described is caching classification-related metadata for a file in an alternate data stream of that file. When a file is classified (e.g., for data management), the classification properties are cached in association with the file, along with classification-related metadata that indicates the state of the file at the time of caching. The classification-related metadata in the alternate data stream is then useable in determining whether the classification properties are valid and up-to-date when next accessed, or whether the file needs to be reclassified. If the properties are valid and up-to-date, they may be used without requiring the computationally costly steps of reclassification. Also described is using more than one alternate data stream for the cache, and extending the classification-related metadata through a defined extension mechanism.

17 Claims, 5 Drawing Sheets

(56) References Cited

U.S. PATENT DOCUMENTS

| | | | |
|---|---|---|---|
| 2006/0149704 A1 | 7/2006 | Wyatt et al. | |
| 2007/0203884 A1 | 8/2007 | Nichols et al. | |
| 2008/0065698 A1 | 3/2008 | French et al. | |
| 2008/0184223 A1 | 7/2008 | Evers | |
| 2009/0178103 A1 | 7/2009 | Graham et al. | |
| 2009/0271779 A1* | 10/2009 | Clark | G06F 8/68 717/171 |
| 2010/0030781 A1 | 2/2010 | Wong et al. | |
| 2010/0042625 A1 | 2/2010 | Zoellner et al. | |
| 2010/0145917 A1 | 6/2010 | Bone et al. | |

OTHER PUBLICATIONS

"Alternate Data Stream Tools for NTFS 2.2", retrieved at <http://wareseeker.com/Security-Privacy/alternate-data-stream-tools-for-ntfs-2.2.zip/362614>, Oct. 18, 2005, pp. 2.

"File Classification Infrastructure", retrieved at <http://download.microsoft.com/download/D/D/3/DD3FB42C-D3C7-47C0-9431-40D80256FB0A/FCI_TDM_WP_May_09.pdf>>, Technical White Paper, May 2009, pp. 14.

"MSDN", retrieved at <http://msdn.microsoft.com/en-us/library/dd392493(VS.85).aspx>, Jul. 30, 2009, pp. 2.

Casey, Eoghan, "Tool Review—WinHex", retrieved at <<http://citeseerx.ist.psu.edu/viewdoc/download?doi=10.1.1.90.5342&rep=rep1&type=pdf>>, Digital Investigation, 2004, pp. 114-128.

Dillon, Steven, "Hide and Seek: Concealing and Recovering Hard Disk Data", retrieved at <<http://citeseerx.ist.pus.edu/viewdoc/download?doi=10.1.117.9336&rep=rep1&type=pdf>, Jul. 2006, pp. 17.

* cited by examiner

| Section | Field |
|---|---|
| Header_A | Version identifier |
| | Checksum of sections Header_B through end of cache |
| Header_B | Timestamp of cache |
| | Size of cache |
| | Optional Offset of FieldExtension_1 |
| | Flags |
| | Number of properties |
| | Hash of file ID, directory ID, last modified time, and file path |
| PropertyHeader_1 | Type (optional; present in one implementation) |
| | Flags (optional; present in one implementation) |
| | Size of Property |
| | Value Offset |
| Property_1 | Name [variable size] |
| | Value [variable size] |
| ... | |
| FieldExtension_1 [optional] | Extension identifier |
| | Optional Offset of Next Field Extension |
| | <Extended fields> [variable size] |
| ... | |

*FIG. 3*

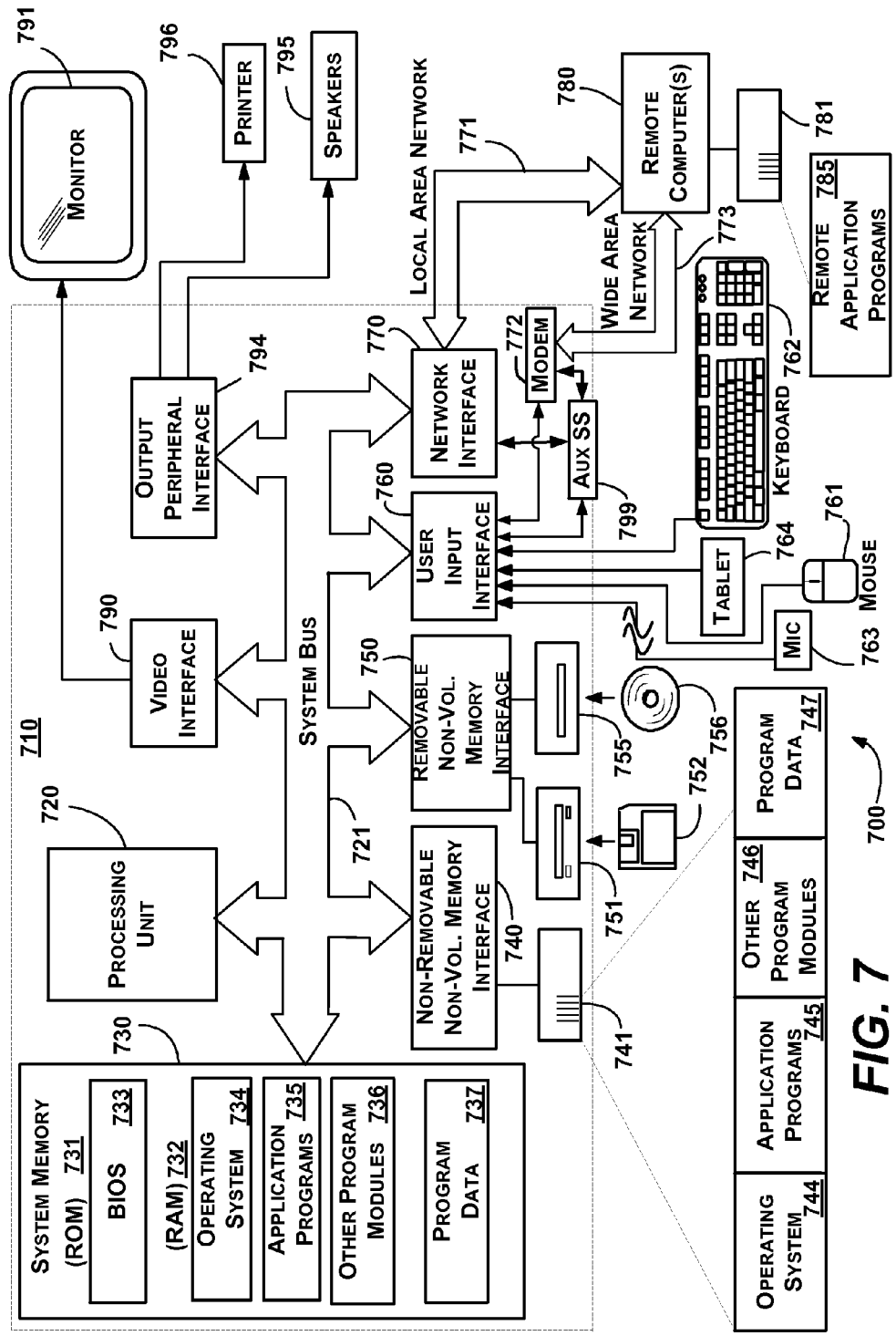

ALTERNATE DATA STREAM CACHE FOR FILE CLASSIFICATION

CROSS REFERENCE TO RELATED APPLICATION

This application is a divisional of application Ser. No. 12/605,451, filed Oct. 26, 2009, and now assigned U.S. Pat. No. 8,805,837 which is incorporated herein by reference in its entirety.

BACKGROUND

In a typical enterprise environment, the amount of data that is maintained and processed is enormous and rapidly increasing. Information technology (IT) departments to have to deal with many millions or even billions of files, in dozens of formats. Moreover, the existing number tends to grow at a significant (e.g., double-digit yearly growth) rate.

IT departments have started to utilize file classification as a solution to managing these billions of files. When a file is classified according to a classification request, its contents may be read, applicable classification rules are processed into classification properties, and the resulting classification properties used by IT administrators to apply policies to files.

These steps, however, especially in the context of classifying huge numbers of files, are time-intensive and resource-intensive. If a file server performed such steps for every classification request of each file, the typical server would not have enough resources to perform its primary task of serving files. As a result, a solution is needed that provides for file classification yet does not overwhelm server resources.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which classification-related metadata for a file is cached in a persistent location, e.g., in an alternate data stream of that file, for faster subsequent access. When determining whether to reclassify a file, (if the cache is present), the cache is accessed to determine whether the classification property or properties from a previous classification are up-to-date. If so, the classification property or properties may be used without performing reclassification. Thus, classification only need be performed initially before the cache exists, or if there has been a change to the file contents or location, or the classifier state (e.g., one or more of the rules used to classify a file have changed or the way such rules are applied has changed). If initially classified or reclassified, the classification-related metadata is updated for future use.

In one aspect, the cache may be composed of more than one alternate data stream, e.g., a first alternate data stream for the classification-related metadata and at least one other alternate data stream for the classification property or properties. The cache may also be extended by a defined extension mechanism.

In one aspect, the cache-related metadata is maintained in a data structure including a timestamp that is used to determine if the classifier state has changed since the cache was last written. The cache-related metadata also may include a hash of the file identifier, parent directory identifier, last modified time, and file path data to determine whether since last cached, the file contents and/or location have changed relative to the current state of the file.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 3 is a representation of an example data structure for use in maintaining metadata related to file classification in an alternate data stream cache.

FIG. 7 shows an illustrative example of a computing environment into which various aspects of the present invention may be incorporated.

DETAILED DESCRIPTION

Figure 1:
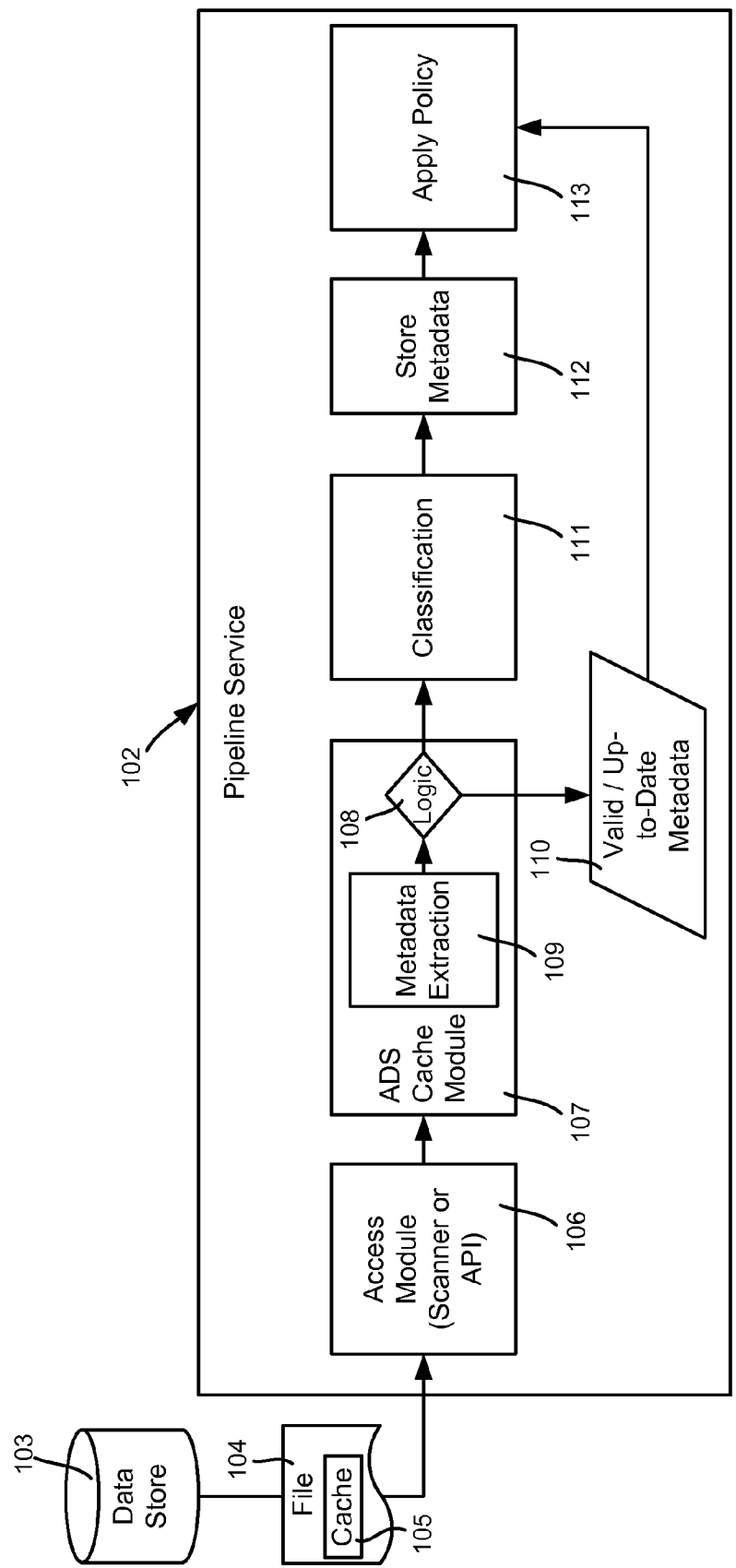
FIG. 1 is a block diagram representing an example pipeline service including a cache module for processing a file's alternate data stream cache to determine whether classification can be bypassed.

Various aspects of the technology described herein are generally directed towards caching classification metadata that results from a classification request for a file within at least one alternate data stream (ADS) of that file. Note that a file's alternate data stream provides a way to store ancillary content and other metadata in conjunction with the user-visible content that is generally stored in the file's primary data stream. The ability to associate one or more alternate data streams to a certain file is a feature of many modern file systems, including Microsoft Corporation's NTFS technology.

Examples of classification metadata for a file include applied property descriptors (ID, name, and so forth), property values, additional metadata about the file, and a timestamp or change identifier indicating when the classification was performed. When a subsequent classification request for that file occurs, the metadata and timestamp in the alternate data stream (or streams) are compared to the file's current metadata in order to determine whether the cached properties are up-to-date. If so, then those properties can be immediately returned to the requestor, e.g., to apply policy with respect to that file. Otherwise, the file is reclassified to obtain updated classification metadata before returning the classification metadata including updated properties to the requestor.

As can be readily appreciated, by caching classification results (metadata) with the file's alternate data stream, the process is able to skip reclassification of files except for the initial classification request, or when the file or classification rules have been updated; (note that classification rules may comprise any policy that automatically determines classification properties for files, and are further described in the aforementioned U.S. patent application Ser. No. 12/427,755). In the absence of any update, reclassification may be skipped and the properties stored within the cache can be quickly retrieved and returned to the requestor.

Moreover, the classification metadata "moves" with the file (e.g., via data updates in the NTFS master file table). Although such movement causes reclassification, this is useful is because the cache acts as a de facto store of properties that moves with the file in the event that a file does not have any other kind of property store. As a result, these properties can be retrieved even if the new location to which the file is moved does not have any classification rules. By way of example, if a file is classified as BusinessImpact=HBI (high business impact), and then moves to another location that does not set BusinessImpact, when the file's properties are retrieved, the cache is able to provide the originally set HBI value.

It should be understood that any of the examples herein are non-limiting. Indeed, as one example, various data structures are described for storing the classification metadata, however these are only example ways to store such information, and alternative data structures may be used. As another example, the term "alternate data stream" is not limited to a data stream provided with an existing file system, but more generally refers to a persistent stream of data associated with a certain file by any mechanism, including by using features of a file system and/or other software components, e.g., by using other structures and/or features of a file system.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data classification in general.

FIG. 1 shows various aspects related to the technology described herein, including a pipeline for processing data items as further described in U.S. patent application Ser. No. 12/427,755, hereby incorporated by reference. In the example of FIG. 1, the pipeline is implemented as a service 102 that operates on any set of data as represented by the data store 103, including a file 104, which as described herein includes an alternate data stream useable as a cache 105. Note that as described below, the cache 105 may include more than one alternate data stream, and/or part of it may be in a separate data store. Further note that because the classification metadata is maintained in an alternate data stream cache 105, the examples herein are described with reference to a file. However, other data items that have a mechanism for maintaining an alternate set of data with that data item such that the alternate data moves with the data item is equivalent.

In general, the pipeline service 102 includes a file access component 106 that may scan the data store 103 to discover files for classification, including the file 104, and/or an API or the like that is called as part of accessing the file 104. For example, when a file open is requested on a file server, an API can be called by a requestor, such as to obtain information for applying policy with respect to that file.

In general, the pipeline performs classification on data items as represented by block 111 in FIG. 1. However, for a file 104 that may have an alternate data stream cache 105, a cache module 107 including cache module logic 108 determines if the file has cached classification metadata. If the cache module logic 108 determines that the appropriate cache 105 exists, current metadata is extracted (block 109) for the file 104 (and other sources as described below) and compared against the cached metadata. If the cached metadata is up-to-date (and valid), the appropriate part of the metadata 110 (e.g., the classification properties) are returned for use by a requestor, bypassing the classification steps of reading, classifying and storing. In the example of FIG. 1, the requestor applies policy (block 113) based on the properties, however other consumers of the metadata/properties may use the returned information.

FIG. 1 also shows the cache module logic 108 branching through the pipeline service 102 for the file's initial classification (when no metadata exists) and for outdated (or invalid) classification metadata. In such situations, further metadata extraction is performed as needed (block 109), e.g., to read the file contents, classification based on that metadata is performed (block 111), and the new or updated classification metadata including any changed properties are stored (block 112) in the alternate data stream cache 105 of the file. The appropriate metadata is then returned to the requestor, e.g., to apply policy (block 113).

Figure 2:
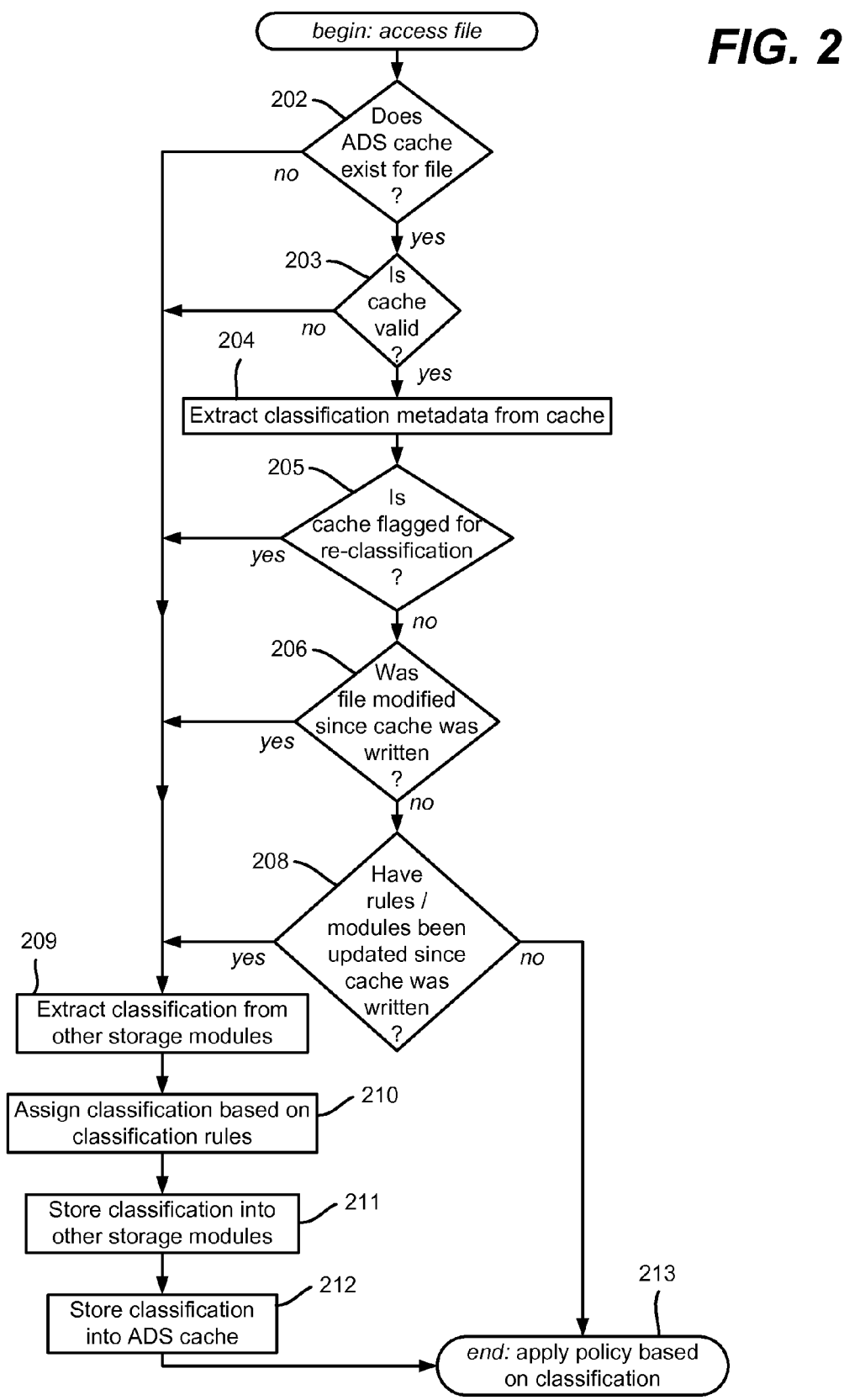
FIG. 2 is a flow diagram representing example steps performed by the cache module to determine whether the cached data exists and is up-to-date (and valid) or whether classification needs to be performed.

FIG. 2 illustrates example logic for handling the interaction of the alternate data stream cache 105 with the classification pipeline service 102 when determining the classification for a single file 104 in the pipeline. Step 202 represents determining whether the metadata cache exists, e.g., by reading the NTFS master file table. If not, step 202 branches to steps 209-212 to classify the file as described in aforementioned U.S. patent application Ser. No. 12/427,755, e.g., extract any classification-related information from any other storage modules (step 209, if they exist and are applicable for the file), assign the file with classification data according to the classification rules/modules (step 210), store the classification data into the other storage modules (step 211, if applicable), and store the classification into the alternate data stream cache of this file (step 212). Basically, when the cache does not exist, it is treated the same as if the classification-related "metadata" is invalid.

After the initial classification, the file 104 has an alternate data stream cache 105, whereby the next time processed, step 202 will instead branch to step 203 to determine whether the cache and the metadata are up-to-date and valid. Step 203 represents a check of the cache to determine if it is valid, which includes a first-pass check evaluating a version identifier and checksum as described below, as well as one or more checks ensuring that all fields in the cache adhere to the specification of the particular cache implementation. If not valid, the process branches to step 209 to perform reclassification; otherwise, it will branch to 204 to extract the cache metadata.

With respect to whether the file metadata including the classification properties are up-to-date, once classification is determined for a file, the classification metadata indicates an outdated cache if the file is modified since the moment the cache was created/written (thereby making the properties out-of-date). This includes if the file is renamed or moved to another location within the file system (which may result in a classification change based on the new location), if the classification rules are modified, and/or if the internal state or configuration of modules that determine classification is modified. For example, even if the rule modules are unchanged, the ordering and/or way of combining two or more rule modules may change, and any such state change may result in a different file property classification result and thereby outdated metadata. The classification properties can also be considered outdated if a cache is manually flagged as needing reclassification (as described below).

Thus, the cache module logic 108 is configured to detect outdated metadata. Step 205 represents determining whether the cache was flagged as needing reclassification. Step 206 represents determining whether the file was modified (its contents or location) since the cache was last written. If either is the case, reclassification is performed via steps 209-212.

Note that even if an existing cache is considered out-of-date, any classification properties contained within the cache are already retrieved in step 204 and can be taken into account as the pipeline reprocesses the classification of the file. Thus, the cache also acts as a store for classification results, such as when no other storage modules exist for the file. By way of example, an administrator may explicitly "set" properties on a file independent of classification, whereby the alternate data stream acts as a property storage mechanism rather than a cache. As another example, consider a file that is placed in a folder that marks its files as having high business impact (BusinessImpact=HBI). When the file is classified, BusinessImpact=HBI is written into its cache. If the file is then moved to another folder that marks its files as having low business impact (BusinessImpact=LBI), the next time the file is processed, the move is detected, which indicates that the cache is to be considered out-of-date. However, as part of classification (or other processing) for property reevaluation, BusinessImpact=HBI is read from the cache and considered. In one implementation (based upon policy), because HBI has a higher precedence than LBI, it retains its HBI value. The cache thus retains the BusinessImpact=HBI value, and the hash is updated so that it will be considered up-to-date in the next classification run.

Even if the file has not changed, the classification rules or the internal state/configuration of classifier modules may have been modified, whereby the metadata is also considered out-of-date. Note that the logic 108 has access to the timestamp/state data of the classifier modules, e.g., via an API or the like. More particularly, the timestamp indicates the time (e.g., in UTC) at which the cache was last written, whereby during a classification run, this timestamp is compared against the times of when classification rules and modules were last updated. If the cache timestamp is older, then the cache is no longer considered up-to-date, allowing the pipeline to reclassify the file under the new rule and module configuration. The evaluation of these rule module conditions is represented by step 208, which branches to steps 209-212 to reclassify if an out-of-date condition is present, or skips reclassification if the metadata is up-to-date by branching to step 213.

Once the metadata is valid and up-to-date, whether by determining validity/an up-to-date state or following reclassification, the metadata (e.g., the classified properties therein) may be used. Step 213 of FIG. 2 represents the application of policy based upon the way in which the file has been classified as represented in its metadata.

In order for the cache module logic 108 to be able to detect validity and an up-to-date state, the cache metadata that is written to the alternate data stream cache 105 includes various information, such as the information exemplified in the data structure of FIG. 3. For example, the metadata includes a timestamp 330 indicating when the classification was last performed, and a hash value in field 335 of the file identifier, the directory identifier of the path under which the file is located (parent directory), the relative path name of the file from the file system's root, and the last modified time of the file.

A change in the current file metadata that corresponds to any one of these fields changes the corresponding current hash value, indicating that the cache is out-of-date. In other words, if any of the current metadata contributing to the previously hashed value changes, the newly generated hash value will be different. For example, if the file is modified, the last modified time will change; if the file is renamed or moved, the directory identifier and path name will change. If the file is replaced with another file of the same name and location, the file identifier and last modified time will change.

When storing classification properties, the cache module logic 108 generates the hash value and stores it in the alternate data stream cache 105 along with the current timestamp. Note that this may occur during the store metadata phase, that is, in conjunction with the storing of classification properties by the store metadata module (block 112 of FIG. 1). When writing the alternate data stream cache 105 to the file system, the storage module ensures that the last access time and last modified time of the file remains unchanged.

The next time classification is requested and the alternate data stream cache is extracted, the cache module logic 108 extracts and generates the hash value based on the current corresponding metadata of the file, and compares it to the hash value stored in the alternate data stream cache 105. If the values are different, then the cache is out-of-date; (this corresponds to step 206 of FIG. 2). The cache module logic 108 also has the ability to retrieve from the classification pipeline (or other data location) the times at which classification rules and modules/module state were last updated. If any of these times are more recent than the timestamp stored in the alternate data stream cache, then the cache is also considered out-of-date; (this corresponds to step 208 of FIG. 2). As described above, if the cache is valid and up-to-date, then the pipeline skips the other modules that further extract, classify and store classification results.

In general, the purpose of the two fields 340 and 341 in $Header_A$ is to facilitate a quick first-pass check of the cache's validity; (this corresponds to step 203 of FIG. 2). If the ADS cache module encounters a cache with a different version in the field 340 (e.g., a GUID), it ignores the cache completely and reclassification is performed to write a new cache. Future extensions of the ADS cache are defined using field extensions (as described below), rather than defining a different format specification in order to maintain forward and backward compatibility.

The Checksum field 341 stores a hash of the cache from the beginning of $Header_B$ to the end of the cache. When the cache module logic reads the cache, it hashes the beginning of $Header_B$ to the end of the cache and compares it (also represented by step 203 of FIG. 2) to the value in this field to quickly check that the cache has not been corrupted or unintentionally modified; however this check does not ensure that the cache has not been tampered with. Any user with access to the file with which the cache is associated also has access to the cache and thus may be able to modify the cache fields along with the checksum in order to maintain checksum consistency. For this reason, even if the checksum is consistent with the cache contents, further double-checking of the offset and size fields for consistency is performed in order to prevent exploits via buffer overruns.

The $Header_B$ section includes the metadata used to determine whether or not the cache is current, as described above. This section also includes data for the cache size and offsets of other sections of the cache, along with one or more flags. For example, a flag may be set in cases where the classification pipeline wants to ensure that the file will go through the entire pipeline again on the next classification run (for instance, after a user manually sets a classification property; this flag is checked in step 205 of FIG. 2).

With respect to the hash field 335, in one implementation, the hash value is a hash of a data structure containing the file ID, parent directory ID, file path and name, and last write time of the file.

In the data structure of FIG. 3, the properties are located after $Header_B$. Each property is represented by a PropertyHeader section (e.g., 355) immediately followed by a Property section (e.g., 350). The PropertyHeader section indicates the type of property stored (the type is optional) and the size and offsets of the property name and value that occur after the header. The Property section has the property name and value itself. Additional PropertyHeader and Property sections appear one after another for each additional property that the cache stores.

The data structure of FIG. 3 also allows for future extensibility by allowing other metadata to be included in the cache. For instance, further metadata other than that described herein may be used in helping to detect whether a cache is up-to-date, whereby such metadata may be stored in the cache. Because simply defining additional fields in subsequent implementations of the cache may end up breaking compatibility with previous implementations of the cache, field extensions and rules that cache modules need to follow when reading and writing to the cache are defined.

More particularly, in addition to the fields of an extension, each field extension includes a unique identifier that identifies that extension, shown in FIG. 3 by the extension identifier (e.g., GUID) in the field extension header (e.g., the fields labeled 360). To maintain backward compatibility, when reading a cache, if the cache module logic 108 detects a field extension that is not recognized based on the identifier, the logic ignores the fields in the extension. To maintain forward compatibility, when writing a cache, the cache module logic leaves intact any field extensions that it does not recognize. Any values defined within field extensions should not depend on values defined outside of the field extension, otherwise cache modules that do not recognize the extension may not maintain consistent value dependence when writing to the cache. If for any reason an extension needs to depend on outside values, it needs to have a mechanism for determining whether or not these values have been independently changed and take appropriate action in such cases.

Figure 4:
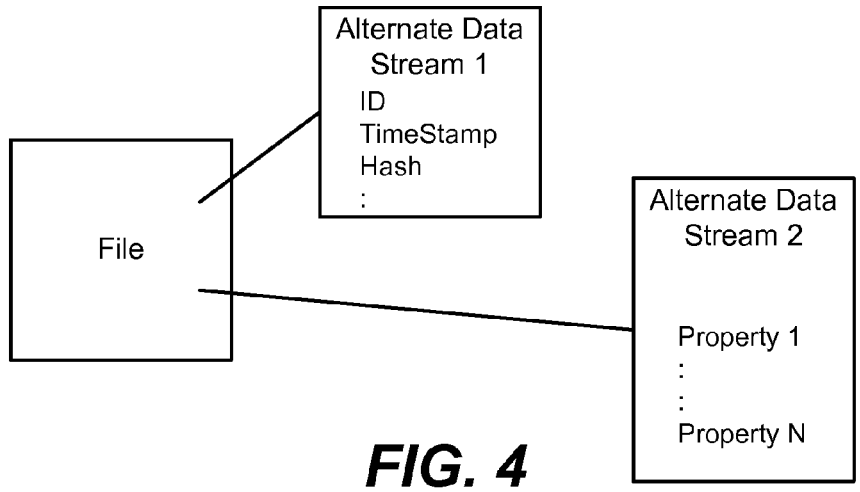
FIG. 4 is a representation of maintaining a cache of metadata related to file classification in two or more alternate data streams.

FIG. 4 shows an alternative implementation in which the classification metadata cache is divided among more than one alternate data stream. More particularly, for efficiency, some of the metadata (e.g., the minimal set needed to determine cache validity and its up-to-date state including ID, timestamp and hash) may be maintained in one data stream, with the remainder (e.g., the properties and extensions) maintained in another data stream. In this alternative implementation, when determining whether a cache is valid and up-to-date, only the one, generally small alternate data stream needs to be accessed.

Note that more than two alternate data streams may be used, e.g., one for determining validity and the up-to-date state, one for properties, and one for extensions. Properties and/or extensions also may be divided among different alternate data streams.

Figure 5:
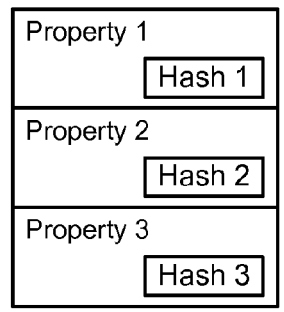
FIG. 5 is a representation of maintaining a cache of metadata related to file classification in an alternate data stream and a separate data store.

FIG. 5 shows an alternative implementation in which each property has its own associated hash that is evaluated instead of a hash for the entire cache. In this alternative, a change to a property does not necessarily make the entire cache outdated.

By way of example, consider that one property value, Property 2, changes often, however that property only needs to be evaluated on the first day of each month to determine how to apply policy. By associating each of the properties with its own hash value, the logic may then configured such that unless it is the first of the month, only the hash for Property 1 and Property 3 are checked to see if there has been a change to one of those properties. If not, reclassification is not necessary. On the first of the month, all three properties including Property 2 are checked to determine whether at least one has changed thereby triggering reclassification.

Figure 6:
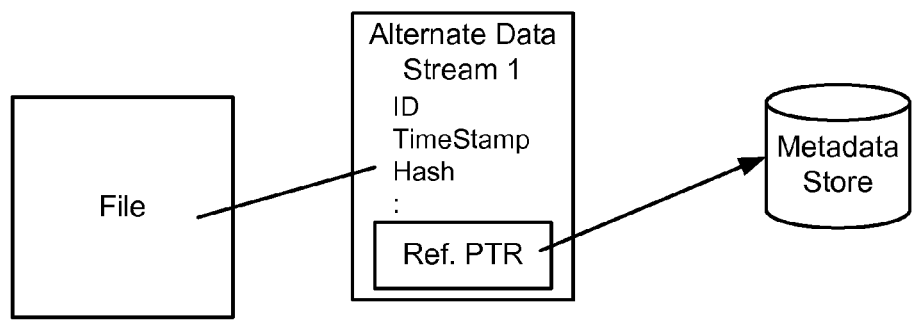
FIG. 6 is a representation of how properties within a cache of metadata related to file classification each can be associated with separate hash data for determining whether each property is up-to-date or needs to be updated via reclassification.

FIG. 6 shows another alternative implementation, in which some of the metadata is maintained in a separate data store, e.g., a database. For example, instead of a property or set of properties (or an extension or set of extensions), a reference (e.g., a pointer/URL) or the like may point to that metadata. In this way, a large set of metadata need not be maintained with the file, for example, and/or classification may be localized, e.g., the same property value may be used with different languages. Further, if a pointed-to property set is combined with the per-property hash concept of FIG. 5, a set of one or more properties may be shared by more than one file, since the hash will change whenever any file is reclassified such that a shared property changes.

Exemplary Operating Environment

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for file classification comprising:
   storing classification-related metadata associated with a file in at least one alternate data stream of that file, the classification-related metadata including a timestamp containing a time value that indicates a time that a data structure was last written and at least one hash that each contains a hash value indicative of a state of the file when the file was last classified; and
   accessing a cache of classification-related metadata associated with the file to determine whether one or more classification-related metadata of the file are valid and up-to-date.

2. The method of claim 1, wherein the at least one hash comprises a first hash value of a file identifier, a directory identifier, file path data, and a last write time of the file.

3. The method of claim 1, wherein the at least one hash comprises a cache size and one or more offsets of the one or more classification-related metadata in the cache.

4. The method of claim 1, wherein the classification-related metadata comprises one or more flags that indicate whether to reclassify the classification-related metadata stored in the cache.

5. The method of claim 1, further comprising, accessing the cache to obtain the one or more classification properties.

6. The method of claim 1, further comprising, accessing the cache to obtain at least one extension.

7. The method of claim 1, wherein determining whether one or more classification-related metadata of the file are valid and up-to-date comprises comparing a first hash value stored in the cache to a second hash value corresponding current information for the file.

8. The method of claim 7, wherein the first hash value stored in the cache is outdated when the second hash value for the file does not match the first hash value stored in the cache.

9. The method of claim 1, wherein determining whether one or more classification-related metadata of the file are valid and up-to-date comprises determining whether the file has been modified since the cache was last written, or determining whether the file has been moved to a new location since the cache was last written.

10. The method of claim 1, further comprising reclassifying the file and updating the cache of classification-related metadata when the classification-related metadata indicates that the one or more classification properties of the file are not valid or up-to-date.

11. In a computing environment, a system comprising:
    a processor; and
    a memory including computer readable instructions that, when executed by the processor, cause the system to provide:
    a cache module storing classification-related metadata associated with a file in at least one alternate data stream, the classification-related metadata including a timestamp containing a time value that indicates a time that a data structure was last written and at least one hash that each contains a hash value indicative a file identifier, a directory identifier, file path data, and a last write time of the file, the classification-related metadata being evaluated to determine whether the one or more classification properties of the file are valid and up-to-date.

12. The system of claim 11, wherein the at least one hash comprises a cache size and one or more offsets of the one or more classification-related metadata in a cache.

13. The system of claim 11, wherein the classification-related metadata comprises one or more flags that indicate whether to reclassify the classification-related metadata stored in a cache.

14. The system of claim 11, wherein determining whether one or more classification-related metadata of the file are valid and up-to-date comprises comparing a first hash value stored in a cache to a second hash value corresponding current information for the file.

15. The system of claim 14, wherein the first hash value stored in the cache is outdated when the second hash value for the file does not match the first hash value stored in the cache.

16. The system of claim 11, wherein determining whether one or more classification-related metadata of the file are valid and up-to-date comprises determining whether the file has been modified since a cache was last written, or determining whether the file has been moved to a new location since the cache was last written.

17. The system of claim 11, further comprising reclassifying the file and updating a cache of classification-related metadata when the classification-related metadata indicates that the one or more classification properties of the file are not valid or up-to-date.

* * * * *